United States Patent

[11] 3,545,813

| [72] | Inventor | Mikio Matsumoto |
| --- | --- | --- |
| | | Hyogo-ken, Japan |
| [21] | Appl. No. | 817,381 |
| [22] | Filed | April 18, 1969 |
| | | Division of Ser. No. 641,525, |
| | | May 26, 1967, abandoned. |
| [45] | Patented | Dec. 8, 1970 |
| [73] | Assignee | The Tsubakimoto Chain Mfg. Co. Ltd |
| | | Osaka, Japan |
| [32] | Priority | July 7, 1966 |
| [33] | | Japan |
| [31] | | No. 41/43821 |

[54] AIR-FILM CONVEYING APPARATUS
8 Claims, 8 Drawing Figs.

[52] U.S. Cl. ............................................. 302/29,
214/1; 302/31
[51] Int. Cl. ....................................... B65g 53/04

[50] Field of Search ............................................. 302/17, 29,
31; 214/1(AB); 198/37, 108; 226/97, 170; 231/74

[56] References Cited
UNITED STATES PATENTS

| 2,990,939 | 7/1961 | Kelly ............................. | 198/108 |
| 3,052,339 | 9/1962 | Carter ........................... | 198/37 |
| 3,469,887 | 9/1969 | Nakahara et al .............. | 302/29 |
| 3,485,616 | 12/1969 | Nitschke ....................... | 214/1(AB)UX |

FOREIGN PATENTS

| 1,342,552 | 9/1963 | France ......................... | 302/29 |

Primary Examiner—Andres H. Nielsen
Attorney—Wenderoth, Lind & Ponack

ABSTRACT: The disclosed air-film conveying apparatus has a platform plate, an air chamber provided underneath the platform plate, a protecting member for the platform plate surface mounted on the surface of the platform plate, and a plurality of air valves opening though the plate and member. And this apparatus has driving equipment for the load thereon.

PATENTED DEC 8 1970

Mikio Matsumoto
INVENTOR.

BY Wendroth, Lind
and Ponack,
Attorneys 3,545,813

1

AIR-FILM CONVEYING APPARATUS

This application is a division of application Ser. No. 641,525 filed May 26, 1967, and now abandoned.

BACKGROUND OF THE INVENTION

This invention relates to an air-film conveying apparatus and load transferring equipment therefor, and more particularly is directed to an air-film conveying apparatus having a soft table surface for transferring flat bottom articles which it is desired to keep free of frictional scratches, and reducing frictional resistance by forming an air-film and a flat bottom surface article lying on the table by compressed air being ejected therebetween, wherein the upper surface of the table is made of a soft resilient material so as to transfer safely and positively the flat bottom articles such as polished glass plates. In addition the apparatus has a support for transferring said flat bottom body which is composed of a soft material and which is adjustable in response to the thickness of the air-film and which can create a sufficient frictional force to produce a transferring force, so that the flat bottom surface article is able to be transferred to any desired position without any scratches on the surface of the flat bottom article.

Heretofore, in transferring flat plates which are required to be kept free of scratches such as glass plates, plastic plates, polished metal sheets, etc., by an air table the upper surface of which is made of a soft, resilient and air permeable material, if the air-film is not formed partially on the table, no frictional scratches occur on the surface of the flat plate. However, after long operation of the table there is the disadvantage that dust in the atmosphere adheres to the elastic articles on the table and "clogging" occurs to deteriorate the air permeability of the air table. Furthermore, in order to obtain good air permeability for various objects on the air table, its durability is required to be sacrificed so as to keep good air permeability, softness, resilience, etc. Accordingly, for the design of these kinds of air tables, softness, resilience, air permeability and also durability must be contemplated to be responsive to the various objects.

Also, the flat bottom article floated over the table by jets of compressed air flowing through the air valves has small frictional resistance on the surface of the air table, and the load on the surface is required to carry it to the desired location. In this case the flat bottom article on the loading surface having a plurality of air valves should for example, cover as many valves as possible, such as a glass plate which has a large bottom area. The greater the number of air valves in the loading table which are covered by the flat bottom articles, the more the effectiveness in reducing the friction on the surface is increased, even if the weight of this load is great. Since there is less frictional resistance on the loading surface due to the presence of the air-film, the driving force to move this article is very small. Normally the article floated on the surface is transferred by the frictional force of a transferring device supported adjacent the apparatus at one or both ends, or in the middle of the article, and a soft material is required for the contacting member so as not to scratch the bottom surface of the load. In this case, it is noted that the relative height of the thickness of the air-film formed between the table and the flat bottom article, and the height of the contacting member is important. For example, when the thickness of the air-film is 1 mm. ejected air on the loading surface loses almost all of its supporting force, if the article is supported at a height of 1.2 mm. by the transferring device. If the height of the transferring device is 0.9 mm. the load cannot be controlled by the conveying apparatus.

SUMMARY OF INVENTION

This invention has eliminated the aforementioned disadvantages in the air-film conveying apparatus by the provision of a layer of pile fabric as the resilient and durable material on the surface of this apparatus and also by the provision of specially shaped air valves opening through the air table.

2

Also, as for the height of the transferring means as aforementioned, this invention provides transferring equipment controlled automatically in response to the thickness of the air-film and also to carry flat surface articles such as polished glass to the desired position without any scratches on the bottom surface. The transferring equipment provides soft contact with the article and proper contacting frictional force.

Therefore, and object of this invention is to provide an air-film conveying apparatus in which the air table has good air permeability.

Another object of this invention is to provide an air-film conveying apparatus which has appropriate softness, resilience, air permeability and also durability on the surface for transferring loads.

A still further object of this invention is to provide an air-film conveying apparatus which prevents clogging due to dust adhering to the surface of the air table.

Still another object is to provide an air-film conveying apparatus in which the protecting member can be made of an air impermeable material.

Still another object is to provide an air-film conveying apparatus in which the air permeability is automatically controlled.

A further object is to provide transferring equipment for an air-film conveying apparatus to transfer the load on the apparatus.

Still another object is to provide transferring equipment for air-film conveying apparatus in which an elastic member is compressed in response to the weight of the load while retaining the air-film layer so as to support the load without any scratches.

Other objects and advantages of this in invention will further become apparent hereinafter, and from the drawings.

DESCRIPTION OF THE PREFERRED EMBODIMENT

Figure 1:
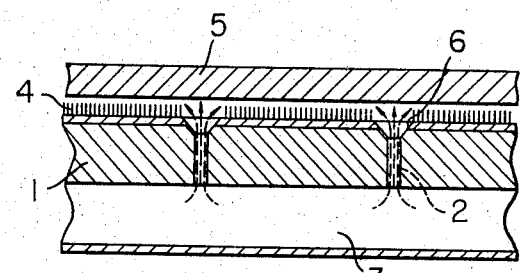
FIG. 1 is a partial sectional view of an air-film conveying apparatus in accordance with the present invention.

Although specific forms of the invention have been selected for illustration in the drawings, and the following description is drawn in specific terms for the purpose of describing those forms of the invention, this description is not intended to limit the scope of the invention, which is defined in the claims.

Referring to the drawings, FIG. 1 shows schematically a table of an air-film conveying apparatus in section, the conveying apparatus comprising a platform plate 1 having holes or air valves 2 therethrough through which compressed air is passed from air chamber 3 provided below the platform plate, a protecting member 4 being mounted on the upper surface of the plate. A load or flat bottom surface article 5 to be transferred is disposed on the air table. The protecting member 4 is made of pile fabric such as carpet, or velvet so as to protect the flat bottom surface article to be transferred from scratches when it is carried on the air table. This protecting member is also perforated like the above platform plate with the perforations being alined with the holes 2. In order to avoid clogging by dust or fibers separated from the protecting member due to the long operation and a consequent increase in resistance to flow of air through the valves 2, the valves diverge upwardly in a conical hole 6 at the uppermost end and the protecting member also has the perforations diverging upwardly. When the air permeability of the air table becomes greater than required, the number of valves opened or closed can be adjusted manually.

With the above constructional feature, the air table can be prevented from clogging during operation and the deterioration of its air permeability prevented, and the surface of the table can be kept soft and the load on the table is not scratched, thereby enabling the transferring of flat bottom surface articles such as polished glass without any scratches.

By the provision of the expanded opening at the uppermost end of the valves extending through the platform plate or air table and the protecting member, even though the protecting member which is not air permeable is used on the platform plate, the compressed air coming through the valves maintains the air-film above the protecting member.

Figure 2:
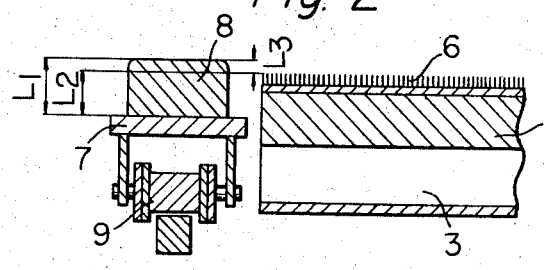
FIG. 2 is a sectional view on a line transverse to the section of FIG. 1 and the transferring equipment of the invention.

Referring now to FIG. 2, transferring equipment in accordance with the invention is shown.

Each transferring device comprises a supporting member 7 which may preferably be slideably mounted on a frame (not shown), a compressible elastic member 8 mounted on the supporting member to directly contact the load and drive it, and a chain 9 pivotally mounted underneath the supporting member and driven by a driving belt (also not shown). The transferring device is a component device of a series of loop transferring devices which may be driven by a drive mechanism such as a motor with drive wheel (FIG. 7) so as to transfer the load such as polished glass on the air table. This equipment may be disposed at each or both ends or in the middle of the air table to drive the load on the table. The elastic member on the supporting member is made of a resilient substance such as foamed synthetic resin.

Figure 3:
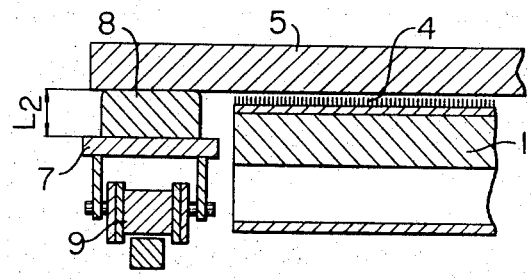
FIG. 3 is a view similar to FIG. 2 showing the apparatus with a load thereon and no compressed air being supplied through the table.
Figure 4:
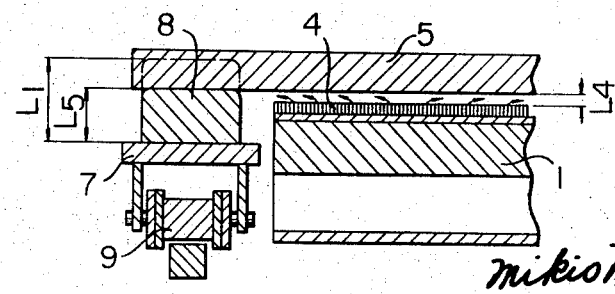
FIG. 4 is a view similar to FIG. 3 but with air being supplied and forming an air-film between the table and the load.

As for the elasticity of the elastic member in the transferring device, if the thickness of the air-film is, for example, assumed to be 2 mm. and also the difference L3 between free height L1 of the elastic member 8 and its compressed height L2, from the surface of the protecting member 8 is assumed to be 5 mm. and also if the material for the elastic member is selected so that its elastic modulus is extremely small, the above difference L3 may be in the range adjustable responsive to the thickness of the air-film plus the value of the relative setting error in elevation between the air table and the transferring device. That is, in the state shown in FIG. 3, when the compressed air for floating the load is not supplied through the valves in the air table the height of the elastic member L2 is compressed to a height corresponding to the uppermost level of the protecting member on the platform plate. In the state shown in FIG. 4, the compressed air for floating the load on the air table is ejected is shown, and in air-film layer L4 is formed on the table, and the height L5 of the elastic member 8 is compressed into balance which comes from the compressed height L2 plus the thickness L4 of the air-film. That is, the thickness required for producing frictional force necessary to transfer the load 5 on the air table is the compressed height L2 lower than the free height L1, thereby permitting relative setting level of the air-film conveying apparatus to allow heavier weight of the load to be transferred, the ejecting pressure of the compressed air, a larger range for its tolerence, and also any frictional scratches to be prevented on the surface of the load such as a flat bottom surface article.

Hereinbefore, the transferring device is adapted to be disposed such that the elastic member is directed upwardly and contacts with the bottom surface of the load to transfer it. Alternatively, in FIG. 5, the transferring device can be disposed upside down compared to the embodiment shown in FIGS. 2 to 4, i.e., the elastic member is directed downwardly and contacts the upper surface of the load on the air-film conveying apparatus.

The transferring device is disposed close to the protecting member thereabove such that the free height L1 is kept, and the thickness possible to be transferred between the air table and the elastic member is approximately the free height L1 of the elastic member minus the maximum compressed height L2. It is pointed out that the decrease of the thickness of the air-film produced by the pressing pressure of the transferring device on the load and the apparent increase of the weight of the load is not contemplated to be a very large problem. For example, in an actual case the weight of 6 mm. thick plate glass 1 square meter in area is approximately 15 kg. Assuming that the coefficient of friction of the protecting member is reduced by the air jet through the valves is 0.0001, only approximately 15 grams will be required to transfer the load on the air table. At the point of practical usage, 10 grams is sufficient to carry the load. Now, if the coefficient of the friction between the elastic member and the plate glass is 0.5, the above pressing force may be 20 grams. The increase of the weight is only 0.1 to 0.2 percent of the weight of 15 kg. Therefore, the decrease of the thickness of the air-film can be ignored.

Also, the increase of the pressing pressure of the elastic member 8 produced when the thickness of the load increases creates the frictional force necessary for transferring the load on the air table, thereby providing self-adjustability thereto which is very convenient.

It will be understood by those skilled in the art that the load or flat bottom surface article is transferred to the desired position on the table only by disposing the transferring device, shown in FIGS. 2 to 5, in a parallel plane to the upper surface of the air table in the apparatus.

Figure 6:
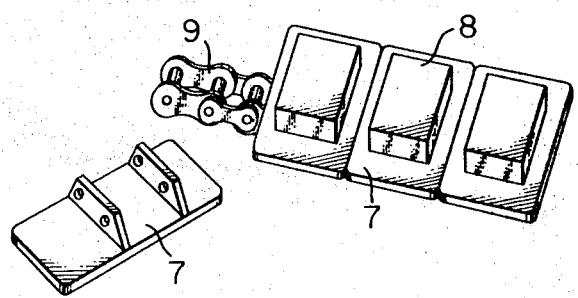
FIG. 6 is a perspective view showing a part of the conveyor of the transferring equipment shown in FIGS. 2, 3, 4 and 5.

In FIG. 6, a perspective view of a part of the transferring equipment is shown. The elastic member 8 is disposed on the supporting member 7 and to the bottom of the supporting member 7 a chain 9 is pivotally connected so that this transferring device is driven by a sprocket (not shown) through this chain to transfer the load on the air table with the elastic member being in contact with the surface of the load. This transferring equipment is usable with the device shown in FIGS. 2, 3 and 4 using it with the elastic member extending upwardly into contact with the surface of the load. The elastic member is made of resilient material such as a spongy substance.

Figure 7:
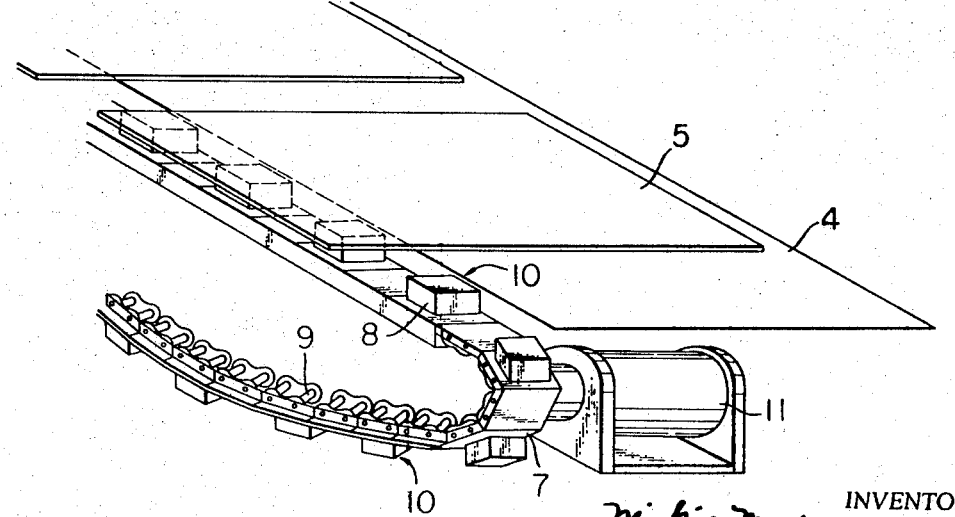
FIG. 7 is a schematic perspective view showing the operation of the transferring equipment beside the air table.

Referring now to FIG. 7, there is shown a perspective view of the transferring equipment beside the air table in accordance with this invention. Each transferring device 10 is connected to the endless chain 9 to form the transferring equipment. This transferring equipment is driven by a certain drive mechanism such as a motor 11 to transfer the load on the air table.

Figure 5:
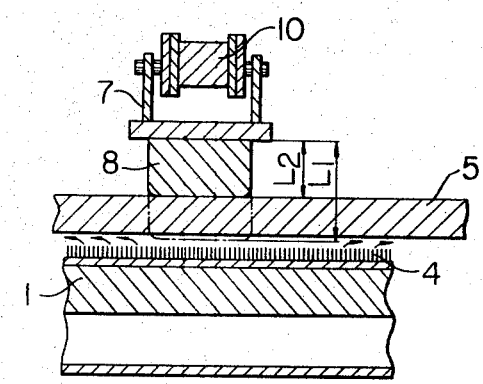
FIG. 5 is a sectional view showing another embodiment of the transferring equipment of the invention.
Figure 8:
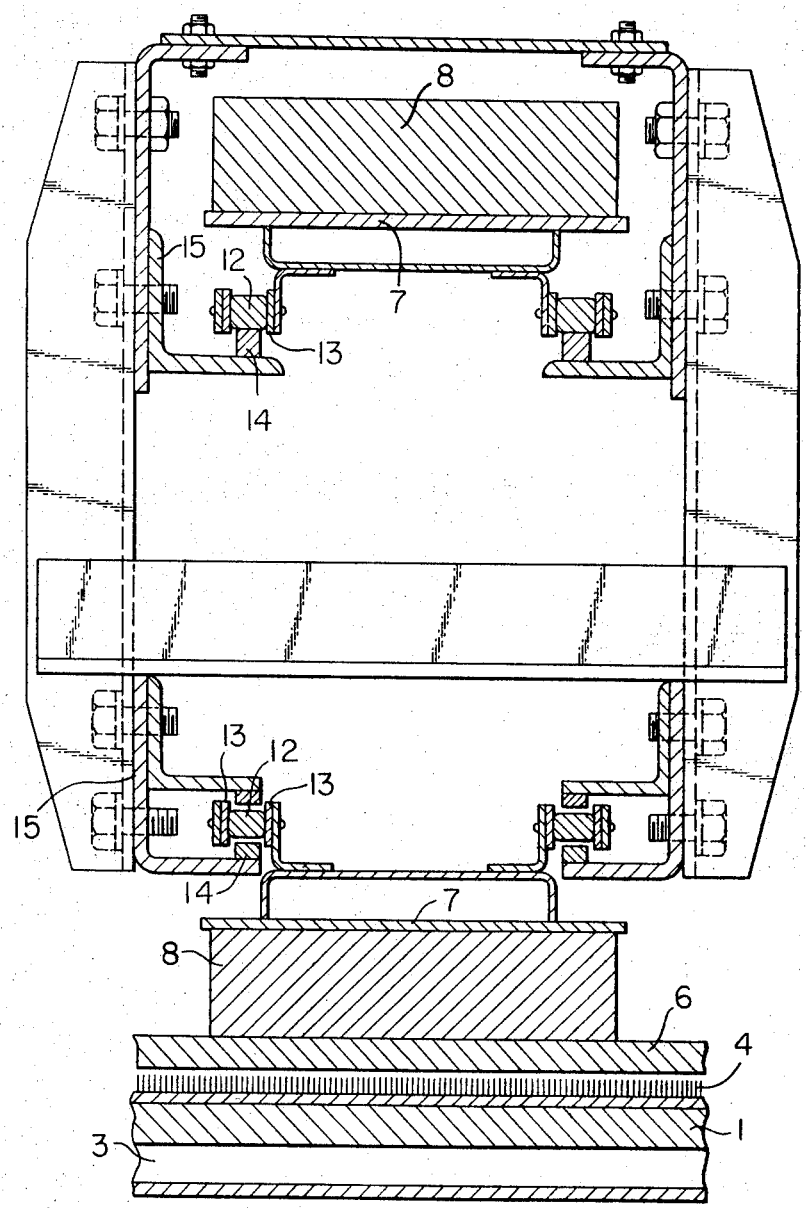
FIG. 8 is a sectional elevational view of another embodiment of the transferring equipment similar to FIG. 5.

The transferring device shown in FIG. 8 is for downwardly contacting the load as as shown in FIG. 5. Extending from opposite sides of the supporting member 7 are slidable rollers 12 guided by guide rollers 13, the slidable rollers 12 being slidably and rotatably disposed on guide rails 14 secured to frame 15 which is fixed above the air table. This endless transferring equipment is continuously driven to rotate so as to transfer the load on the air table, the lower transferring device 8 contacting the load to move it.

By the above air-film conveying apparatus and the load transferring equipment, flat bottom surface articles such as polished glass are transferred without being scratched by floating on the protecting member on the air table, which member is durable and is also perforated so that the air pressure of air ejected through the table is not reduced. Furthermore, there is no requirement to make the assembly very accurate and still the relative height of the air-film and the elastic member in the transferring device is maintained in order to transfer the load by contacting the device with the load, and the conveying apparatus can transfer various loads having a broad range of thickness, and also very easily and conveniently transfer it to any desired position as required such as branching or uniting the loads.

I claim:

1. An air-film conveying apparatus for conveying flat articles, comprising a platform plate, an air chamber provided beneath said plate, a soft, nonscratching protecting material on the top surface of said plate, and a plurality of air valves communicating with said air chamber and opening through said plate and said protecting material, and transporting means provided along said platform plate and disposed so as to contact the flat articles at a height corresponding to the height at which said flat articles are floated by the air-film formed above said platform plate.

2. Air-film conveying apparatus as claimed in claim 1, wherein said protecting material is pile fabric for maintaining a stable air-film between said platform plate and the bottom surfaces of the flat articles.

3. Air-film conveying apparatus as claimed in claim 2, wherein the uppermost part of said valves diverges upwardly through the plate and the material, whereby said valves are prevented from clogging due to the pile separated from the material.

4. Air-film conveying apparatus as claimed in claim 1, wherein said protecting material is made of air permeable material.

5. Air-film conveying apparatus as claimed in claim 1, wherein the flow of air through said air valves is automatically controlled depending upon the air permeability of said material.

6. Air-film conveying apparatus as claimed in claim 1, wherein said transporting means comprises a supporting member, an elastic member mounted on said supporting member and adapted to be compressed during its abutment with the flat articles so as to contact said flat articles at their height corresponding to the height at which said flat articles are floated by the air-film formed above the platform plate, and a chain underneath said supporting member on which said supporting member is mounted, and a driving belt driving said chain.

7. Air-film conveying apparatus as claimed in claim 6 in which said elastic member contacts the under surface of the flat article and is compressed in response to the weight of the flat article loaded on it.

8. Air-film conveying apparatus as claimed in claim 6 in which said elastic member contacts the upper surfaces of the flat articles.